Dec. 26, 1967  L. R. GRABOWSKI ETAL  3,360,308
ACTUATOR ASSEMBLY

Filed Dec. 23, 1964  3 Sheets-Sheet 1

INVENTORS
Leonard R. Grabowski,
& Dan R. Rowland

*A. M. Heiter*
ATTORNEY

Dec. 26, 1967  L. R. GRABOWSKI ETAL  3,360,308
ACTUATOR ASSEMBLY
Filed Dec. 23, 1964  3 Sheets-Sheet 2

INVENTORS
Leonard R. Grabowski,
& Dan R. Rowland

*a. m. Neiter*
ATTORNEY

Dec. 26, 1967  L. R. GRABOWSKI ETAL  3,360,308
ACTUATOR ASSEMBLY
Filed Dec. 23, 1964  3 Sheets-Sheet 3
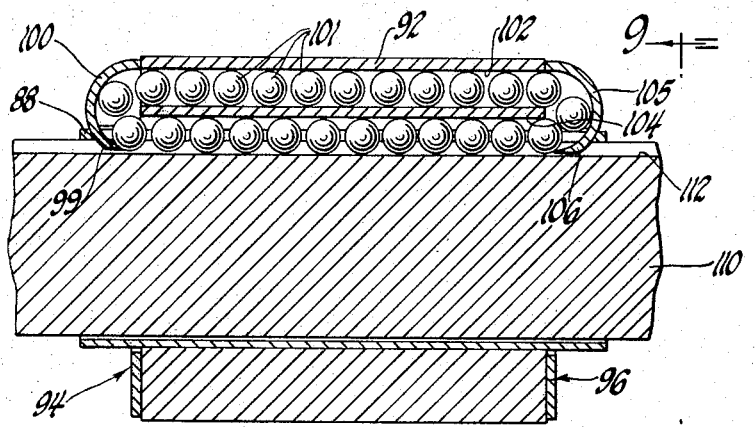
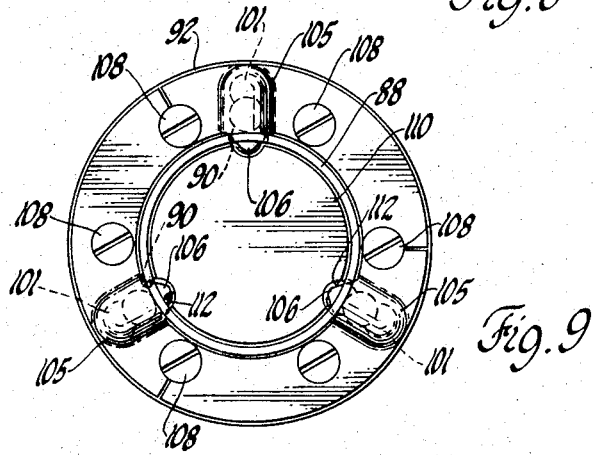
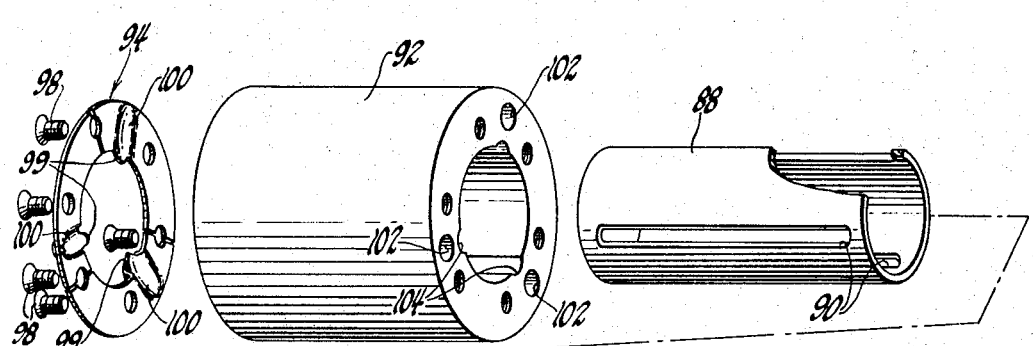
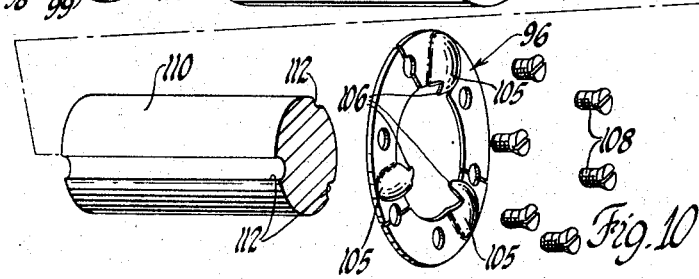
INVENTORS
Leonard R. Grabowski,
& Dan R. Rowland
a. M. Heiter
ATTORNEY United States Patent Office 3,360,308
Patented Dec. 26, 1967

3,360,308
ACTUATOR ASSEMBLY
Leonard R. Grabowski, Bay City, and Dan R. Rowland, Saginaw, Mich., assignors to General Motors Corporation, Detroit, Mich., a corporation of Delaware
Filed Dec. 23, 1964, Ser. No. 420,747
14 Claims. (Cl. 308—6)

This invention relates to actuator assemblies and more particularly to a ball retainer for retaining the balls on one of the ball spline members prior to final assembly.

The assembly of ball spline members is facilitated by having the balls retained by a ball retainer on one of the ball spline members prior to their mating. While the ball retainers of the prior art have proven generally satisfactory, they often do not meet the required standard of versatility of application and simplicity of structure tailored to economical production.

The principle of this invention lies in the provision of ball retaining means which provides a slotted ball retainer received in an accommodating annular space between the ball spline members which will retain the balls in one of the complementary ball grooves on the ball spline members. In the preferred form, the balls which are loaded in the assembly's race provided by the complementary ball grooves and recirculated by ball return means on one spline member are received by slots of the ball retaining means which is secured to this spline member with the aid of the ball return means. The slots are sufficiently wide to permit the balls to extend therethrough for drive transmittal and are also sufficiently narrow to retain the balls on the spline member having the ball returns means when the spline members are disconnected. The ball retaining means structure together with the simple and efficient manner of its connection to one of the spline members provides a low cost, simply constructed, versatile retainer for ball retention especially suited for economical production.

An object of this invention is to provide in a ball spline assembly, ball retaining means retained on one of the ball spline members with the aid of ball return means providing ball recirculation and having slots through which the balls extend for drive transmittal between the members narrower than the diameter of the balls to retain the balls on the one member prior to final assembly of the ball spline members.

Another object of this invention is to provide in a ball spline assembly, ball retaining means accommodated in an annular space between the telescoping ball spline members, the ball retaining means having axially extending slots firmly held in alignment with the ball grooves of the ball spline members, the slots being tapered and having their smallest width sufficiently wide to enable the balls to extend therethrough for drive transmittal and sufficiently narrow to retain the balls on the spline member to which the ball retaining means is secured when the ball spline members are disconnected.

Another object of this invention is to provide in a ball actuator assembly, ball retaining means located between the ball actuator members secured to one of the actuator members by ball return means providing ball recirculation and having slots to accommodate the balls through which drive is transmitted.

These and other objects of the invention will be more apparent from the following description and drawing in which:

FIGURE 8 is a longitudinal view with parts in section showing a third embodiment of a ball spline assembly constructed according to this invention.

FIGURE 9 is a view taken on the line 9—9 in FIGURE 8.

FIGURE 10 is an exploded view of the FIGURE 8 assembly.

Figure 1:
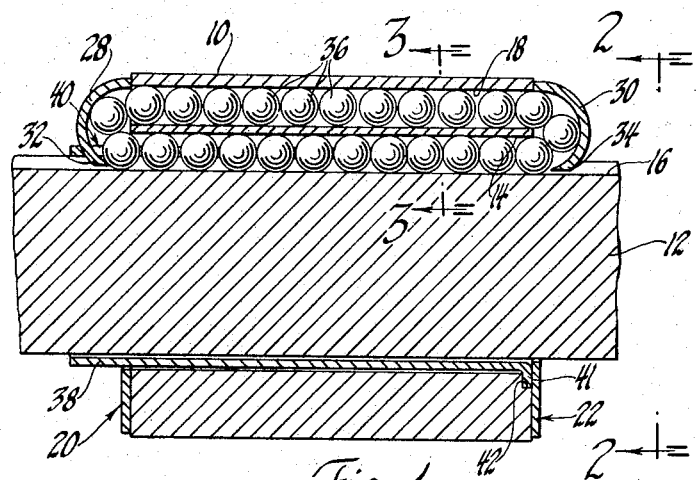
FIGURE 1 is a longitudinal view with parts in section showing one embodiment of a ball spline assembly constructed according to this invention.
Figure 2:
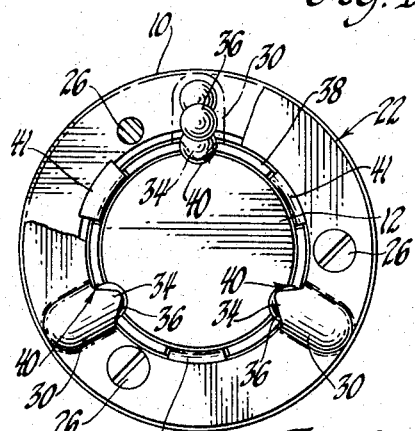
FIGURE 2 is a view taken on the line 2—2 in FIGURE 1.

Referring first to the embodiment shown in FIGURES 1–4, the ball spline assembly there shown comprises an outer cylindrical ball spline member 10 and an inner cylindrical ball spline member 12 having axially-extending straight ball grooves 14 and 16 respectively which mate to provide three circumferentially arranged and symmetrically located raceways.

Axially-extending return passages 18 are provided for the raceways, each return passage being provided by a bore straight through the female spline member 10 and located radially outward of its associated raceway and at the same angular position.

End caps 20 and 22 are apertured to receive the member 12 and are also apertured to receive screws 24 and 26 respectively which secure the end caps to the opposite ends of the female spline member body. End caps 20 and 22 have smoothly curved channel portions 28 and 30 respectively providing curved return passages for connecting the opposite ends of the straight return passages 18 to their conjunctive raceways. Deflector fingers 32 and 34 at the raceway ends of channel portions 28 and 30 respectively extend into the associated ball grooves 16 of the male spline member 12 to complete the endless ball circuits for the endless trains of balls 36 which are inserted into the return passages and raceways prior to securing of the last end cap.

The balls 36, which provide the endless ball circuits, transmit through groove contact torque between the spline members and permit through rolling action in the raceways' telescopic or relative axial movement between the spline members while continuing to transmit torque. The deflector fingers deflect the balls to and from the raceways to and from the end cap's channel portions and the connected return passages, the balls traveling under loaded conditions in their raceway and under unloaded conditions in their return passage.

A cylindrical ball retainer sleeve 38 is mounted in the annular space between members 10 and 12, this space being made slightly larger than normal. The sleeve has three axially-extending, tapered slots 40 through which the balls extend sufficiently to normally engage their ball grooves, as best shown in FIGURES 1 and 3.

The end of sleeve 38 at which the slots are open has flanged tongues 41 which are received in accommodating recesses 42 in member 10 whereby relative angular movement between the sleeve and the female spline member is prevented to maintain the ball retaining slots in alignment with their associated raceways. The deflector fingers are also received in the slots.

Figure 3:
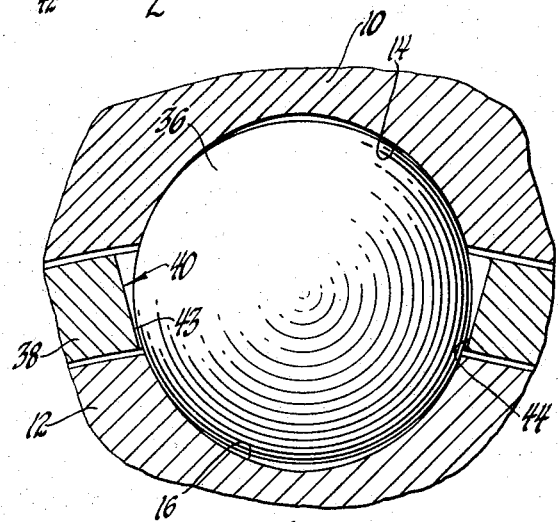
FIGURE 3 is an enlarged view taken on the line 3—3 in FIGURE 1.
Figure 4:
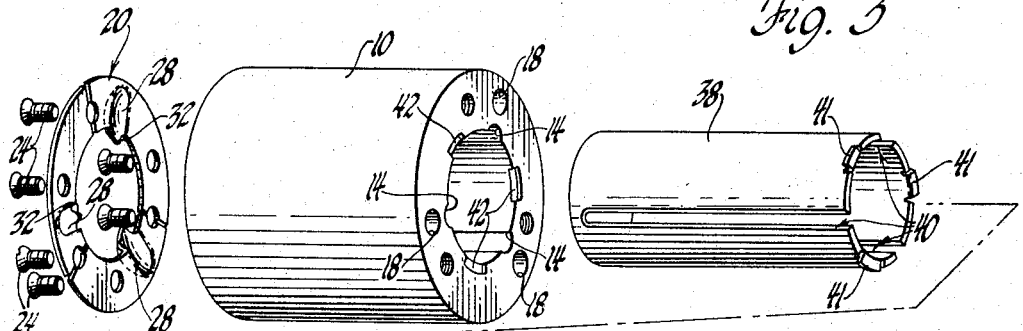
FIGURE 4 is an exploded view of the FIGURE 1 assembly.
Figure 4:
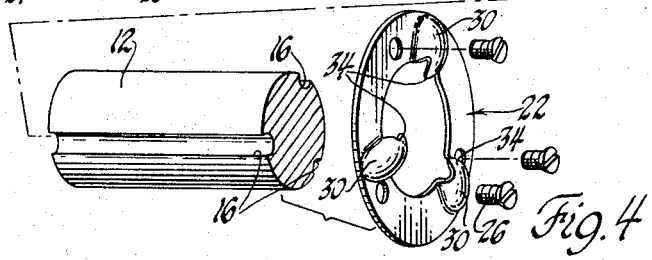

The opposite side walls 43 and 44 of the tapered slots converge in the direction of the sleeve axis, as best shown in FIGURE 3, to provide the openings of the slots at the sleeve's inner radius with a width less than the diameters of balls 36. With the male spline member 12 removed from the female spline member 10, balls 36 are retained by the slots' side walls 43 and 44 in the ball grooves in the female spline member 10 and thus in their return passages. This enables the balls 36 to be assembled and retained in the return passages and ball grooves in the female spline member prior to mating of the female spline member with the male spline member.

For example, at initial assembly the sleeve 38 is inserted through the right-hand end of the female spline member 10 prior to securing of the end caps 20 and 22. Then with sleeve 38 in position with its tongues 41 inserted in the recesses 42, the end cap 20 is next secured in place. Recognizing that the deflector fingers of end cap 20 extend through the slots, this end cap is split into the three segments shown to facilitate the entry of the deflector fingers through the slots. Then with all three segments of cap 20 in position, screws 24 are threaded into engagement to hold the now completely assembled end cap 20 in position on the female spline member. Next the balls 36 are inserted through the yet open ends of the return passages and raceways and finally the end cap 22, which is of one piece structure, is positioned in place recognizing that its deflector fingers will be received by the open ends of the slots. Then with the screws 26 threaded into engagement, the end cap 22 is fixed flush to the right-hand end of the female ball spline member with portions of its flush-face surface contacting the tongues 41 to securely hold the sleeve 38 in position on the female ball spline member. This provides a simple manner of retaining the balls on the female ball spline member prior to the insertion of the male spline member.

Figure 5:
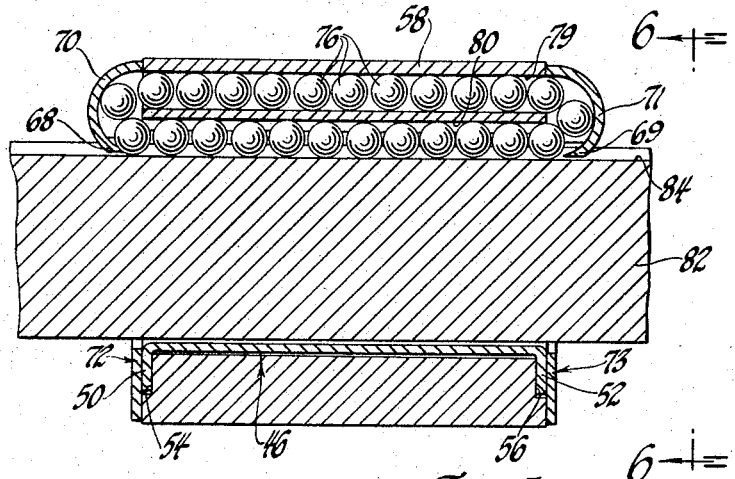
FIGURE 5 is a longitudinal view with parts in section showing a second embodiment of a ball spline assembly constructed according to this invention.
Figure 6:
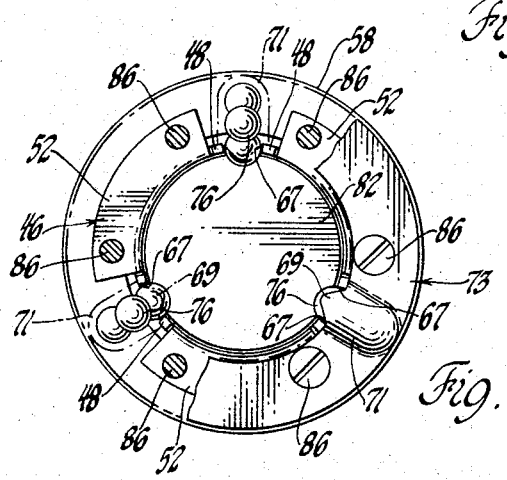
FIGURE 6 is a view taken on the line 6—6 in FIGURE 5.
Figure 7:
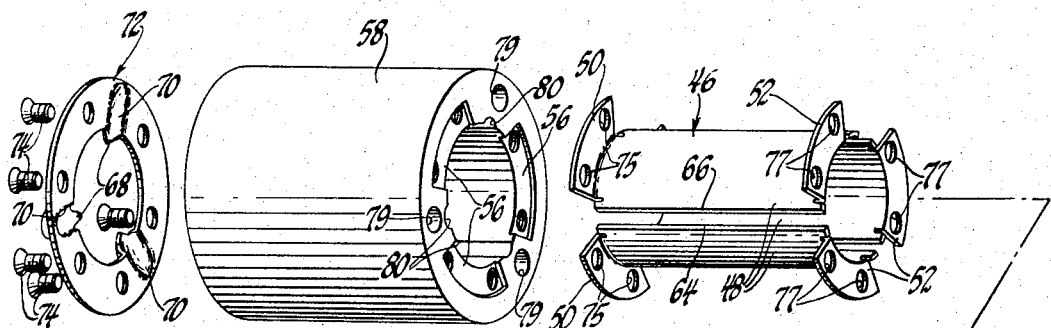
FIGURE 7 is an exploded view of the FIGURE 5 assembly.
Figure 7:
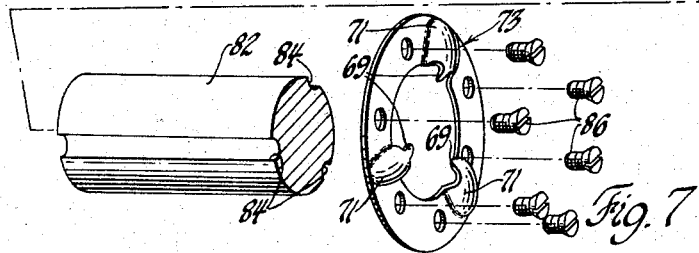

In the second embodiment shown in FIGURES 5 through 7, the cylindrical ball retainer sleeve generally designated at 46 is split into three identical segments 48 which have flanged tongues 50 and 52 at their opposite ends. Tongues 50 and 52 because of their wedge shape are deflectible for insertion into the accommodating recesses 54 and 56 respectively provided in the female ball spline member 58. With the segments 48 in position on member 58, the adjacent tapered edges 64 and 66 between segments provide the tapered slots 67 for ball retention like the slots 40 of the FIGURE 1 assembly. Since the slots 67 are open at their opposite ends and thus free to receive the deflector fingers 68, 69 of the ball return channels 70, 71 respectively, both end caps 72 and 73 may be of one piece construction.

At assembly the sleeve segments are first positioned and then the end cap 72 is secured to the left-hand end of the female spline member 58, as viewed in FIGURE 5, by the screws 74 which also extend through accommodating apertures 75 provided in the tongues 50 of the sleeve segments. The balls 76 are then inserted through the yet open right-hand ends of the return passages 79 and the ball grooves 80 of member 58. Next the end cap 73 is secured in position by the screws 86 which also extend through accommodating apertures 77 provided in the tongues 52. The balls 76 are thus retained in the female spline member's ball grooves and return passages prior to final mating of the female spline member 58 with the male spline member 82 through engagement of the balls with the latter member's ball grooves 84.

Referring now to the third embodiment shown in FIGURES 8 through 10, the cylindrical ball retainer sleeve 88 is of one piece construction and has tapered slots 90 which are closed at both ends. The end caps 94 and 96 are each split into three segments.

At initial assembly with sleeve 88 first inserted, the end cap 94 is then secured to the left-hand end of the female ball spline member 92 by the screws 98, the segmenting of end cap 94 permitting the entry of the deflector fingers 99 of the ball return channels 100 into the retaining slots 90. Next the balls 101 are inserted through the yet open ends of the return passages 102 and the female spline member's ball grooves 104. Then, with the balls positioned in the ball grooves 104 and return passages 102, the end cap 96 with its ball return channels 105 and deflector fingers 106 is positioned by segment, like end cap 94, on the right-hand end of the female ball spline member and secured by the screws 108. The deflector fingers of both end caps in addition to deflecting the balls during telescoping operation engage the sleeve in the slots as best shown in FIGURES 8 and 9 to prevent both angular and axial movement of the sleeve 88 relative to the female ball spline member 92 thus effectively securing the sleeve to the female ball spline member. The balls are thus retained on the female spline member by the slots 90 prior to insertion of the male spline member 110 with its ball grooves 112.

Although the ball races of the antifriction ball or actuator assemblies are shown as being straight, it will be understood that the invention is applicable to assemblies having helical ball spline connections.

The tapered wall slots of the ball retainers are preferred since a tapered wall slot permits a greater sleeve thickness for greater sleeve strength over a sleeve having a vertical wall slot for the same sleeve accommodating clearance between the male and female ball spline members. However a vertical wall slot may be utilized where it is desired to use a relatively thin wall sleeve having relatively high strength properties.

The above-described preferred embodiments are illustrative of the invention which may be modified within the scope of the appended claims.

We claim:
1. In a ball spline assembly the combination of male and female spline member having complementary, longitudinally extending grooves providing raceways, trains of antifriction elements loaded in said raceways drivingly connecting said members, said members having an annular space therebetween, retaining means mounted in said space and operatively connected to one member, said retaining means comprising sleeve means of constant radial thickness having slots through which said antifriction elements extend, said slots having widths sufficiently narrow to retain said antifriction elements in the grooves of said one member when said members are disconnected.

2. In a ball spline assembly the combination of male and female spline members having complementary, longitudinally extending grooves providing raceways, trains of antifriction elements loaded in said raceways drivingly connecting said members, said members having an annular space therebetween, ball retaining means mounted in said annular space and operatively connected to one member, said ball retaining means comprising hollow cylindrical means of constant inner and outer radius having longitudinally extending slots receiving said balls, each said slot having opposite side walls converging in directions of intersection to provide a slot opening adjacent the grooves of the other member smaller than the diameters of said balls so that said balls are retained in the grooves of said one member by said side walls when said members are disconnected.

3. In a ball spline assembly the combination of male and female spline members having complementary, longitudinally extending ball grooves providing raceways, ball return means carried by one member, said ball return means having return passages operatively connecting the opposite ends of said raceways providing endless ball passages, trains of balls mounted in said endless ball passages providing driving connections in said raceways between said members, said members having an annular space therebetween, ball retaining means mounted in said annular space and operatively connected to said one member, said ball retaining means comprising elongated hollow cylindrical means of constant radial thickness slightly smaller than the radial dimension of said annular space, said cylindrical means having longitudinally extending slots receiving said balls, said slots having widths sufficiently large to permit said balls to operate in said raceways and sufficiently narrow to retain the balls in the ball grooves of said one member so that said trains of balls are retained on said one member when said members are disconnected.

4. The ball spline assembly set forth in claim 3 and said slots having opposite side walls converging in directions of intersection to provide said slot widths.

5. In an actuator assembly the combination comprising male and female actuator members having complementary ball grooves providing raceways, ball return means carried by said female actuator member, said ball return means having return passages operatively connected at opposite ends to said raceways to provide endless ball passages, trains of balls mounted in said endless ball passages providing driving connections in said raceways between said members, said members having an annular space therebetween, ball retaining means mounted in said annular space and held on said female actuator member by said ball return means, said ball retaining means comprising elongated hollow cylindrical means having a constant radial thickness just small enough to fit in said annular space, said cylindrical means having slots receiving said balls, said slots having slot widths sufficiently large to permit said balls to operate in said raceways and sufficiently narrow to retain the balls in the ball grooves of said female actuator member so that said trains of balls are retained on said female actuator member upon removal of said male actuator member.

6. The actuator assembly set forth in claim 5 and said slots having tapered side walls to provide said slot widths.

7. In a ball spline assembly the combination comprising male and female spline members having complementary, longitudinally extending ball grooves providing raceways, ball return means carried by one member, said ball return means having return passages operatively connected at opposite ends to said raceway to provide endless ball passages, trains of balls mounted in said endless ball passages providing driving connections in said raceways between said members, said members having an annular space therebetween, ball retainer means comprising a sleeve mounted in said annular space, said sleeve having longitudinally extending slots open at one sleeve end, said slots receiving said balls and having slot widths sufficiently large to permit said balls to operate in said raceways and sufficiently narrow to retain the balls in the ball grooves of said one member when the other member is disconnected, said one sleeve end having tongues and said one member having recesses receiving said tongues whereby relative angular movement between said sleeve and said one member is prevented and said ball return means including a cap member secured to said one member retaining said tongues in said recesses.

8. In a ball spline assembly the combination comprising male and female spline members having complementary, longitudinally extending ball grooves providing raceways, ball return means carried by one member, said ball return means having return passages operatively connected at opposite ends to said raceways to provide endless ball passages, trains of balls mounted in said endless ball passages providing driving connections in said raceways between said members, said members having an annular space therebetween, sleeve means comprising a plurality of longitudinally extending arcuate sleeve segments mounted in said annular space, said segments having adjacent longitudinally extending edges angularly spaced providing longitudinally extending slots between adjacent segments receiving said balls, said slots having slot widths sufficiently large to permit said balls to operate in said raceways and sufficiently narrow to retain the balls in the ball grooves of said one member when the other member is disconnected, said segments having tongues at their opposite ends, said one member having recesses receiving said tongues and said ball return means including cap members having securing means securing said cap members and said tongues to said one member.

9. In a ball spline assembly the combination comprising male and female spline members having complementary longitudinally extending ball grooves providing raceways, ball return means carried by one member, said ball return means having return passages operatively connected at opposite ends to said raceways to provide endless ball passages, trains of balls mounted in said endless ball passages providing driving connections in said raceways between said members, said members having an annular space therebetween, ball retainer means comprising a sleeve with a constant inner and outer radius mounted in said annular space having longitudinally extending closed end slots receiving said balls, said slots having slot widths sufficiently large to permit said balls to operate in said raceway and sufficiently narrow to retain the balls in the ball grooves of said one member when the other member is disconnected and said ball return means including end caps secured to said one member having ball deflector fingers engaging said sleeve at the opposite ends of said slots for preventing both angular and longitudinal movement of said sleeve relative to said one member.

10. In an antifriction ball assembly combination, a cylindrical member having ball grooves extending from one end to the other end, said cylindrical member having ball return means including ball deflector fingers providing return passages operatively connected at opposite ends to said ball grooves, ball retaining means operatively connected to said cylindrical member, said ball retaining means including a sleeve with a constant inner and outer radius having slots aligned with said ball grooves, trains of balls mounted in said ball grooves and associated return passages, said slots receiving the balls in said ball grooves, said slots also receiving said deflector fingers at spaced points along their slot lengths to prevent relative movement between said sleeve and said cylindrical member and said slots between said spaced points having side walls converging in directions away from said ball grooves to provide slot openings slightly smaller than the diameters of the balls.

11. In an antifriction ball assembly combination, a cylindrical member having ball grooves extending from one end to the other end, said cylindrical member having ball return means including ball deflector fingers providing return passages operatively connected at opposite ends of said ball grooves, ball retaining means operatively connected with the aid of said ball return means to said cylindrical member, said ball retaining means comprising thin sleeve means with a constant inner and outer radius having tapered slots aligned with said ball grooves, trains of balls mounted in said grooves and associated return passages, the balls in said ball grooves extending through said slots and said slots receiving at their opposite ends said deflector fingers and having their narrowest slot widths slightly less than the diameters of said balls.

12. In an antifriction ball assembly combination, a cylindrical member having ball grooves extending from one end to the other end, said cylindrical member having ball return means providing return passages operatively connected at opposite ends to said ball grooves, ball retaining means comprising a sleeve having a cylindrical surface of constant radius, said sleeve having a uniform thickness and slots open at one end of said sleeve aligned with said ball grooves, trains of balls mounted in said ball grooves and associated return passages, the balls in said ball grooves received by said slots, said slots having slot widths slightly less than the diameters of said balls, said sleeve end having tongues and said cylindrical member having recesses receiving said tongues whereby relative angular movement between said sleeve and said cylindrical member is prevented and said ball return means including a cap member secured to said cylindrical member retaining said tongues in said recesses.

13. In an antifriction ball assembly combination, a cylindrical member having ball grooves extending from one end to the other end, said cylindrical member having ball return means providing return passages operatively connected at opposite ends to said ball grooves, sleeve means comprising a plurality of separate arcuate sleeve segments having cylindrical surfaces of constant radius, said segments having adjacent edges angularly spaced providing slots between adjacent segments aligned with said ball grooves, trains of balls mounted in said ball grooves and associated return passages, the balls in said ball grooves received by said slots, said slots having slot widths slightly less than the diameters of said balls, said segments having tongues at their opposite ends, said cylindrical member having recesses receiving said tongues and said ball return means including cap members having securing means securing said cap members and said tongues to said cylindrical member.

14. In an antifriction ball assembly combination, a cylindrical member having ball grooves extending from one end to the other end, said cylindrical member having ball return means providing return passages operatively connected at opposite ends to said ball grooves, ball retaining means comprising a sleeve with a constant inner and outer radius having slots closed at both ends aligned with said ball grooves, trains of balls mounted in said ball grooves and associated return passages, the balls in said ball grooves extending through said slots, said slots having slot widths slightly less than the diameters of said balls and said ball return means including end caps secured to said cylindrical member having ball deflector fingers engaging said sleeve at the opposite ends of said slots for preventing both angular and longitudinal movement of said sleeve relative to said cylindrical member.

References Cited

UNITED STATES PATENTS

| | | | |
|---|---|---|---|
| 640,397 | 1/1900 | Merker | 308—6 |
| 1,094,972 | 4/1914 | Bocorselski | 308—6 |
| 1,750,140 | 3/1930 | Thompson | 308—6 |
| 2,451,359 | 10/1948 | Schlicksupp | 308—6 |
| 2,503,009 | 3/1950 | Thomson | 308—6 |
| 2,628,135 | 2/1953 | Magee | 308—6 |
| 2,681,836 | 6/1954 | Jarund | 308—6 |
| 2,890,594 | 6/1959 | Galonska | 308—6 X |
| 3,012,421 | 12/1961 | Cull | 64—11 |
| 3,042,459 | 7/1962 | Magg | 308—6 |
| 3,045,457 | 7/1962 | Blanchard | 308—6 |
| 3,046,808 | 7/1962 | De Mart | 308—185 X |
| 3,070,405 | 12/1962 | Hulck | 308—6 |

FOREIGN PATENTS

| | | |
|---|---|---|
| 125,573 | 11/1931 | Austria. |
| 827,138 | 2/1960 | Great Britain. |
| 151,910 | 3/1963 | U.S.S.R. |

MARTIN P. SCHWADRON, *Primary Examiner.*

L. L. JOHNSON, *Assistant Examiner.*